United States Patent
Luo

(10) Patent No.: US 11,355,140 B2
(45) Date of Patent: Jun. 7, 2022

(54) EMOTION ESTIMATION SYSTEM AND NON-TRANSITORY COMPUTER READABLE MEDIUM

(71) Applicant: FUJIFILM Business Innovation Corp., Tokyo (JP)

(72) Inventor: Xuan Luo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 179 days.

(21) Appl. No.: 16/458,200

(22) Filed: Jul. 1, 2019

(65) Prior Publication Data

US 2020/0013428 A1    Jan. 9, 2020

(30) Foreign Application Priority Data

Jul. 9, 2018    (JP) .............................. JP2018-129928

(51) Int. Cl.
| | | |
|---|---|---|
| *G10L 15/00* | (2013.01) | |
| *G10L 15/04* | (2013.01) | |
| *G10L 25/63* | (2013.01) | |
| *G10L 15/02* | (2006.01) | |

(52) U.S. Cl.
CPC .............. *G10L 25/63* (2013.01); *G10L 15/02* (2013.01)

(58) Field of Classification Search
CPC ......... G10L 15/02; G10L 25/15; G10L 25/63; G10L 25/93
USPC ....................................................... 704/251
See application file for complete search history.

(56) References Cited

U.S. PATENT DOCUMENTS

| | | | |
|---|---|---|---|
| 7,451,079 B2 | 11/2008 | Oudeyer | |
| 8,204,747 B2* | 6/2012 | Kato | G10L 17/26 |
| | | | 704/254 |
| 8,756,061 B2* | 6/2014 | Kalinli | G10L 15/04 |
| | | | 704/254 |
| 9,251,783 B2* | 2/2016 | Kalinli-Akbacak | .... G10L 15/05 |
| 9,621,713 B1* | 4/2017 | Gainsboro | ........ H04M 3/42221 |
| 10,033,857 B2* | 7/2018 | Gainsboro | .............. G10L 25/51 |
| 10,237,399 B1* | 3/2019 | Gainsboro | ........ H04M 3/42221 |

(Continued)

FOREIGN PATENT DOCUMENTS

| | | |
|---|---|---|
| JP | 2003099084 | 4/2003 |
| JP | 4085130 | 5/2008 |

(Continued)

OTHER PUBLICATIONS

Shashidhar Koolagudi G et al., "Contribution of Telugu vowels in identifying emotions," 2015 Eighth International Conference on Advances in Pattern Recognition (ICAPR), Jan. 2015, pp. 1-6.

(Continued)

*Primary Examiner* — Khai N. Nguyen
(74) *Attorney, Agent, or Firm* — JCIPRNET

(57) ABSTRACT

An emotion estimation system includes a feature amount extraction unit, a vowel section specification unit, and an estimation unit. The feature amount extraction unit analyzes recorded produced speech to extract a predetermined feature amount. The vowel section specification unit specifies, based on the feature amount extracted by the feature amount extraction unit, a section in which a vowel is produced. The estimation unit estimates, based on the feature amount in a vowel section specified by the vowel section specification unit, an emotion of a speaker.

8 Claims, 8 Drawing Sheets

(56) References Cited

U.S. PATENT DOCUMENTS

| | | | | |
|---|---|---|---|---|
| 10,964,191 | B2* | 3/2021 | Jati | G08B 21/02 |
| 2009/0313019 | A1* | 12/2009 | Kato | G10L 17/26 |
| | | | | 704/254 |
| 2015/0073794 | A1* | 3/2015 | Kalinli-Akbacak | G10L 15/04 |
| | | | | 704/243 |
| 2015/0281433 | A1* | 10/2015 | Gainsboro | H04M 3/42221 |
| | | | | 379/88.01 |
| 2019/0279644 | A1* | 9/2019 | Yamamoto | G10L 15/10 |
| 2020/0013428 | A1* | 1/2020 | Luo | G10L 25/93 |
| 2020/0082699 | A1* | 3/2020 | Jati | H04W 4/48 |
| 2021/0134300 | A1* | 5/2021 | Yamamoto | G10L 25/63 |

FOREIGN PATENT DOCUMENTS

| | | |
|---|---|---|
| JP | 2017-111760 | 6/2017 |
| JP | 6198872 | 9/2017 |

OTHER PUBLICATIONS

"Office Action of Japan Counterpart Application" with English translation thereof, dated Mar. 23, 2022, p. 1-p. 6.

* cited by examiner

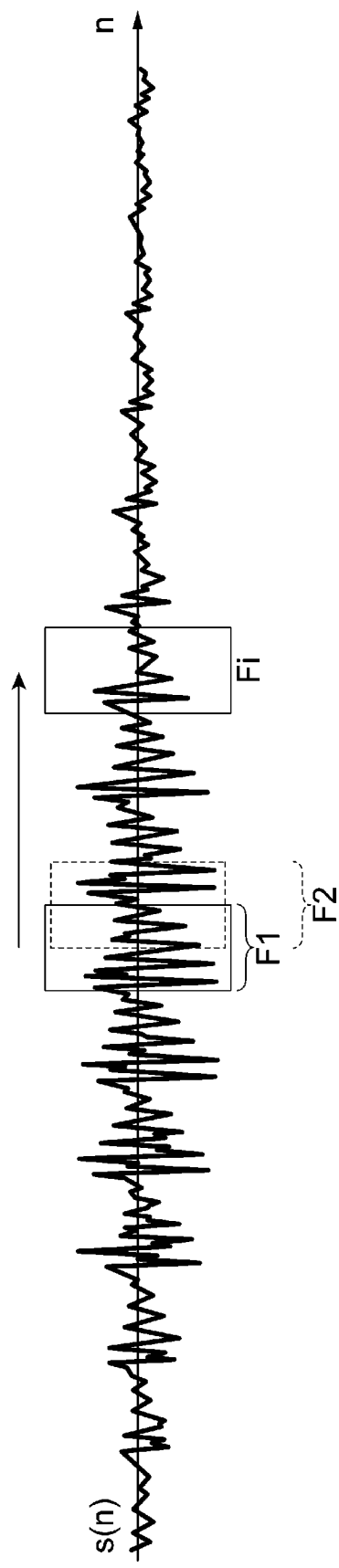

EMOTION ESTIMATION SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-129928 filed Jul. 9, 2018.

BACKGROUND

(i) Technical Field

The present disclosure relates to an emotion estimation system and a non-transitory computer readable medium.

(ii) Related Art

Technologies for estimating emotions of speakers from speech have been available. In Japanese Unexamined Patent Application Publication No. 2017-111760, an emotion estimation device generation apparatus is disclosed that includes an analysis section setting unit that sets an analysis section for which a feature amount of speech data as a source of teacher data is analyzed by performing morphological analysis processing and accent phrase extraction processing on a result of speech recognition processing for the speech data; an accent type setting unit that sets, based on change patterns categorized into a plurality of classes, a pattern of change of a feature amount of speech data included in the analysis section as a change pattern of the feature amount of the speech data included in the analysis section; and an emotion estimation device generation unit that generates an emotion estimation device for estimating, using the speech data categorized according to the change pattern of the feature amount as teacher data, an emotion of a speaker at a time when producing speech, for each change pattern of the feature amount.

Furthermore, in Japanese Patent No. 4085130, an emotion recognition apparatus recognizing an emotion of a speaker by input speech produced by the speaker is disclosed that includes characteristic tone detection means for detecting a characteristic tone associated with a specific emotion in input speech; speech recognition means for recognizing types of phonemes included in the input speech, based on the characteristic tone detected by the characteristic tone detection means; characteristic tone occurrence indicator computation means for computing, for each of the phonemes, a characteristic tone occurrence indicator indicating a likelihood of occurrence of the characteristic tone, based on the types of the phonemes recognized by the speech recognition means; and emotion determination means for determining an emotion of the speaker of the input speech in a phoneme at which the characteristic tone occurs, in accordance with the characteristic tone occurrence indicator computed by the characteristic tone occurrence indicator computing means, based on a rule that the emotion is stronger when the characteristic tone occurrence indicator is smaller.

SUMMARY

In the case where an emotion of a speaker is estimated by analyzing a result obtained by performing speech recognition processing for speech, the speech recognition processing requires heavy load. Furthermore, emotion estimation is susceptible to the influence of noise and the like, and the accuracy of emotion estimation is thus low.

Aspects of non-limiting embodiments of the present disclosure relate to providing a technology for estimating an emotion of a speaker, based on produced speech, with less processing load, less susceptible to the influence of noise and the like, and high accuracy, compared to a configuration for estimating an emotion of a speaker based on a result of speech recognition.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an emotion estimation system including a feature amount extraction unit, a vowel section specification unit, and an estimation unit. The feature amount extraction unit analyzes recorded produced speech to extract a predetermined feature amount. The vowel section specification unit specifies, based on the feature amount extracted by the feature amount extraction unit, a section in which a vowel is produced. The estimation unit estimates, based on the feature amount in a vowel section specified by the vowel section specification unit, an emotion of a speaker.

BRIEF DESCRIPTION OF THE DRAWINGS

Exemplary embodiments of the present disclosure will be described in detail based on the following figures, wherein:

FIG. 2 is a diagram illustrating a setting example of speech frames by a feature amount extraction unit;

DETAILED DESCRIPTION

It is known that emotions of speakers affect sounds in produced speech. Furthermore, sounds of vowels in speech are less susceptible to the influence of noise and the like than sounds of consonants. Thus, in the present disclosure, sounds of vowels in produced speech are paid attention to so that emotions of speakers may be estimated. Hereinafter, exemplary embodiments of the present disclosure will be described in detail with reference to the attached drawings.

<System Configuration>

Figure 1:
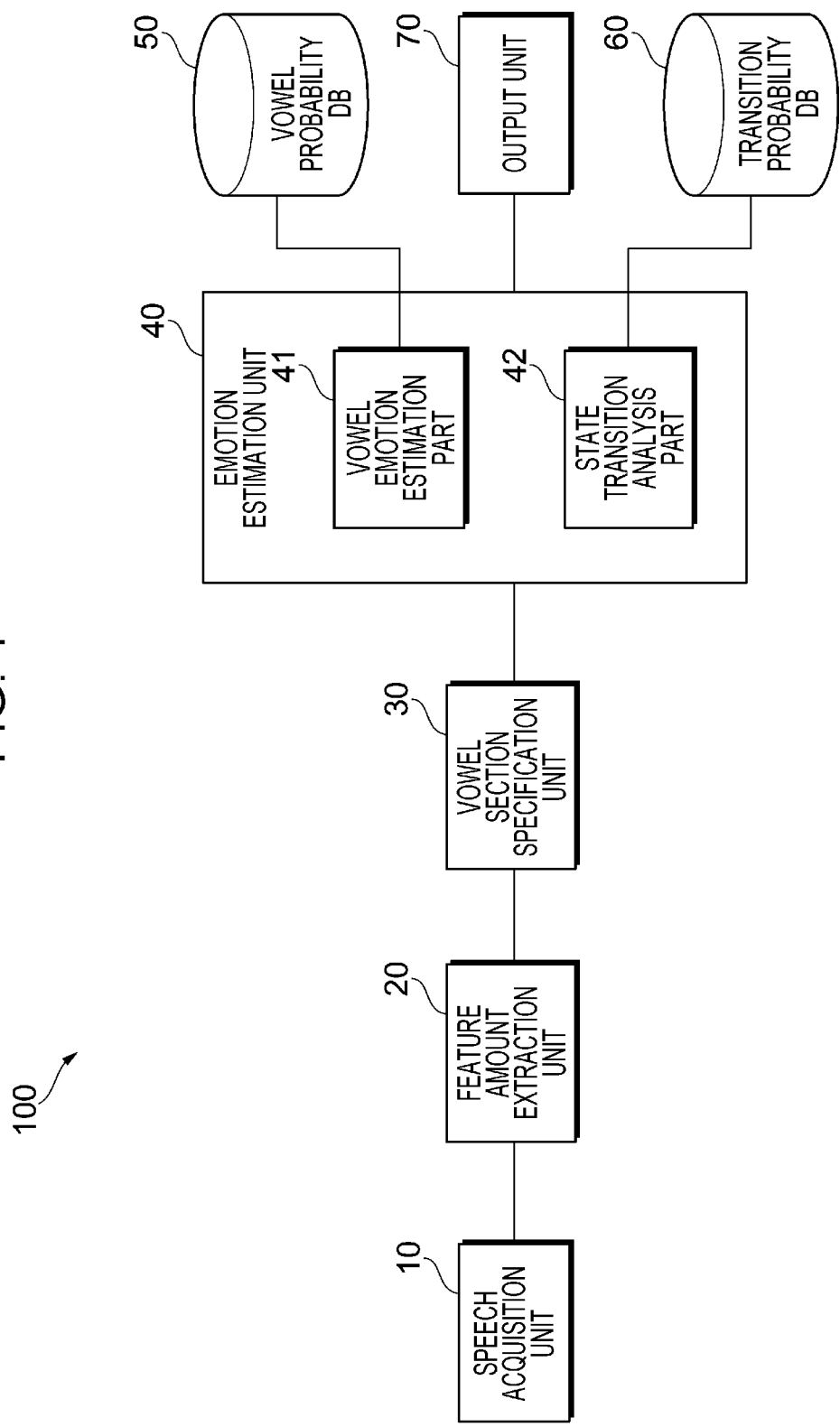
FIG. 1 is a diagram illustrating the entire configuration of an emotion estimation system according to an exemplary embodiment.

FIG. 1 is a diagram illustrating the entire configuration of an emotion estimation system according to an exemplary embodiment. An emotion estimation system 100 includes a speech acquisition unit 10, a feature amount extraction unit 20, a vowel section specification unit 30, an emotion estimation unit 40, a vowel probability database (DB) 50, a transition probability database (DB) 60, and an output unit 70.

The speech acquisition unit 10 is means for acquiring speech as a processing target for estimation of an emotion. For example, a microphone is used as the speech acquisition unit 10. Furthermore, the speech acquisition unit 10 may be connected to an external apparatus via a network interface so that speech data as a processing target may be received from the external apparatus. Furthermore, a storing apparatus in which speech data is stored may be provided as a peripheral apparatus for the system so that speech data as a processing target may be read from the storing apparatus. In this exemplary embodiment, speech of a single speaker is acquired.

The feature amount extraction unit 20 analyzes speech acquired by the speech acquisition unit 10 and extracts a predetermined feature amount. The feature amount extraction unit 20 is an example of feature amount extraction means. A feature amount is a value representing features of a speech signal and is used for specifying a vowel section in speech. In other words, a feature amount is a value regarding an element characterizing a speech signal of a vowel. For example, the amplitude, zero-crossing rate, formant, or the like of a speech signal may be used as a feature amount. The details of processing by the feature amount extraction unit 20 and a feature amount will be described later.

The vowel section specification unit 30 specifies, based on a feature amount extracted by the feature amount extraction unit 20, a vowel section in speech acquired by the speech acquisition unit 10. The vowel section specification unit 30 is an example of vowel section specification means. The vowel section specification unit 30 specifies a vowel section from a speech signal as a processing target. A vowel section is a section of a speech signal as a processing target that includes features of a vowel based on a feature amount. Accordingly, a vowel section is specified from a speech signal as a processing target. The vowel section specification unit 30 only specifies a vowel section in a speech signal and does not perform speech recognition processing for specifying a vowel. The details of processing by the vowel section specification unit 30 will be described later.

The emotion estimation unit 40 estimates an emotion of a speaker at the time when the speaker produces speech as a processing target, based on a feature amount of a vowel section specified by the vowel section specification unit 30. The emotion estimation unit 40 is an example of estimation means. The emotion estimation unit 40 includes a vowel emotion estimation part 41 and a state transition analysis part 42. The vowel emotion estimation part 41 estimates, for each vowel section, an emotion of a speaker who produces speech in the vowel section, based on a feature amount of a speech signal in the vowel section. The state transition analysis part 42 analyzes the relationship of an emotion estimated for a vowel section and an emotion estimated for the vowel section subsequent to the vowel section. The emotion estimation unit 40 estimates an emotion of a speaker at the time when the speaker produces speech acquired by the speech acquisition unit 10, based on a result of estimation by the vowel emotion estimation part 41 and a result of analysis by the state transition analysis part 42.

Details of processing by the emotion estimation unit 40 including the processing by the vowel emotion estimation part 41 and the processing by the state transition analysis part 42 will be described in detail later.

The vowel probability DB 50 stores, for each type of vowel, information on a feature amount pattern corresponding to a predetermined type of emotion. A type of emotion represents a predetermined type of emotion estimated by the emotion estimation system 100. Specific types may be set separately for individual systems. For example, four types: "joy"; "anger"; "sadness"; and "pleasure", may be set, or in addition to these four types, "surprise"; "disgust"; "disappointment"; and the like may also be set. Furthermore, two types: "positive" and "negative", may be set, or in addition to these two types, a "medium state" and the like may also be set. Moreover, various types of emotion may be set in accordance with, for example, the purpose of use by a user of the emotion estimation system 100.

A feature amount mentioned herein represents a feature amount of a speech signal extracted by the feature amount extraction unit 20. A feature amount pattern represents a combination pattern of a plurality of feature amounts. Information on a distribution of probabilities of individual feature amount patterns corresponding to predetermined types of emotion is stored for each type of vowel in the vowel probability DB 50. A distribution of probabilities of individual feature amount patterns corresponding to a type of emotion represents, for each type of emotion, a distribution of probabilities $b(V_{kh}|e_j)$ that a certain feature amount pattern $V_{kh}$ occurs when a speaker has an emotion $e_j$. The vowel emotion estimation part 41 refers to the vowel probability DB 50 to acquire a probability (probability for each vowel section) that a feature amount pattern acquired from a vowel section in speech as a processing target corresponds to each emotion. Then, the vowel emotion estimation part 41 estimates an emotion of the speaker in the vowel section, based on the acquired probability for the vowel section.

The transition probability DB 60 stores, for each combination of types of vowel, information on a state transition probability regarding transition of state between vowels. A state transition probability represents a probability that a state transition from an emotion of a speaker in a vowel section to an emotion of the speaker in another vowel section occurs. For example, a case where four types: "joy"; "anger"; "sadness"; and "pleasure", are set as types of emotion and an emotion of a speaker in a vowel section is "joy" will be considered. The probability that the emotion of the speaker in the vowel section subsequent to the vowel section is "anger" in this case represents a state transition probability of transition from "joy" to "anger" (hereinafter, described as "joy"→"anger"). In this case, with a start point of "joy", there may be four types of state transition: "joy"→"joy"; "joy"→"anger"; "joy"→"sadness"; and "joy"→"pleasure". Therefore, state transition probabilities are obtained for the four types of state transition. In a similar manner, with each of start points of "anger", "sadness", and "pleasure", there may be four types of state transition, and a state transition probability is obtained for each of the start points. Such a state transition probability may be obtained by processing a state transition pattern in a combination of adjacent vowel sections, based on a result of estimation of an emotion for each vowel section in speech collected as a sample. As a method for obtaining a state transition probability from a group of state transition patterns, for example, processing using a hidden Markov model, processing using a recursive neural network, or other various types of existing statistical processing may be used. The state transition analysis part 42 refers to the transition probability DB 60 to obtain, for each combination of vowel sections, a state transition probability regarding transition of state between vowel sections, based on an emotion in each vowel section estimated by the vowel emotion estimation part 41.

The output unit 70 outputs a result of estimation by the emotion estimation unit 40. The details will be described later. The emotion estimation unit 40 identifies a corresponding probability for each of predetermined types of emotion, as an emotion of a speaker at the time of producing speech. Therefore, the output unit 70 may output a type of emotion with the highest probability as an estimation result. Furthermore, the value of the probability may be added to the type of emotion as an estimation result and output. Moreover, a probability value for each set type of emotion may be output. As output means, the output contents mentioned above may be displayed and output on the display device or may be output by a speech message using a speech output mechanism.

<Processing for Extracting Feature Amount>

Next, processing for extracting a feature amount by the feature amount extraction unit 20 will be explained. The feature amount extraction unit 20 divides a speech signal as a processing target into speech frames for individual unit times, and specifies the value of each feature amount for each speech frame.

FIG. 2 is diagram illustrating a setting example of speech frames by the feature amount extraction unit 20. The feature amount extraction unit 20 extracts a feature amount for each speech frame set for a speech signal as a processing target. The length of a speech frame (length of a unit time) and the shift width are not particularly limited and may be set in accordance with recording characteristics or the like of speech. The example of FIG. 2 illustrates how speech frames F1 to Fi are cut out in order in the arrow direction in FIG. 2. Furthermore, in the example illustrated in FIG. 2, the frame F1 and the frame F2 overlap, and speech frames are acquired while moving by a shift width shorter than the frame length. In FIG. 2, the speech frame F2 overlaps with the speech frame F1. For easier identification in the figure, the speech frame F2 is indicated by a broken line and slightly smaller than the speech frame F1. In actuality, however, speech frames of the same size are acquired as the speech frames F1 to Fi. Furthermore, in the example illustrated in FIG. 2, the speech frames F1 to Fi are displayed in a partial area of the illustrated speech signal. In actuality, however, speech frames are acquired from the entire speech, that is, from the beginning to the ending of the speech, acquired by the speech acquisition unit 10 as a target. Furthermore, speech frames may be acquired from a part of speech acquired by the speech acquisition unit 10 in which speech of a specific volume or more is recorded.

The feature amount extraction unit 20 extracts a feature amount of a speech signal in each speech frame specified as described above. As a feature amount, a value indicating various types of information may be extracted. However, at least formants are extracted. Formants represent a plurality of peaks recognized in a frequency spectrum of a speech signal. Formants are called as a first formant, a second formant, and so on in order from the lowest frequency. Frequencies of formants have a characteristic relationship according to the type of vowel. In particular, the relationship of a first formant and a second formant, which are low-order formants, is important to identify vowels. Therefore, in this exemplary embodiment, at least the first formant and the second formant are extracted from a speech signal in each speech frame, as a feature amount of the speech signal in the speech frame, to be used to specify a vowel section.

<Processing for Specifying Vowel Section>

Next, processing for specifying a vowel section by the vowel section specification unit 30 will be explained. The vowel section specification unit 30 specifies a vowel section based on a feature amount for each speech frame extracted by the feature amount extraction unit 20.

Figure 3A:
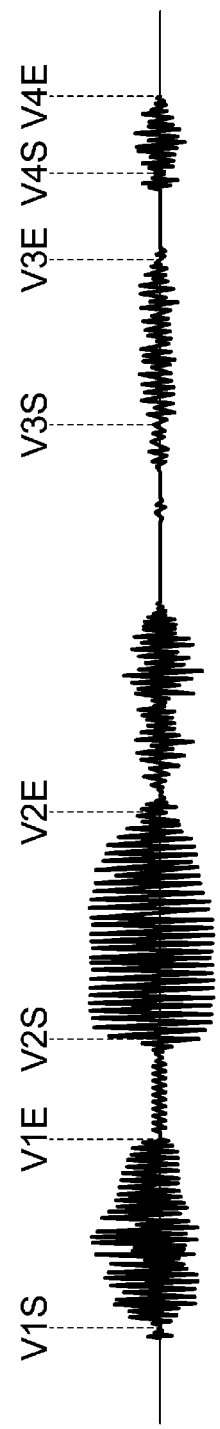
FIG. 3A is a diagram illustrating specific processing for a vowel section, especially illustrating how a start point and an end point of a vowel section are specified.
Figure 3B:
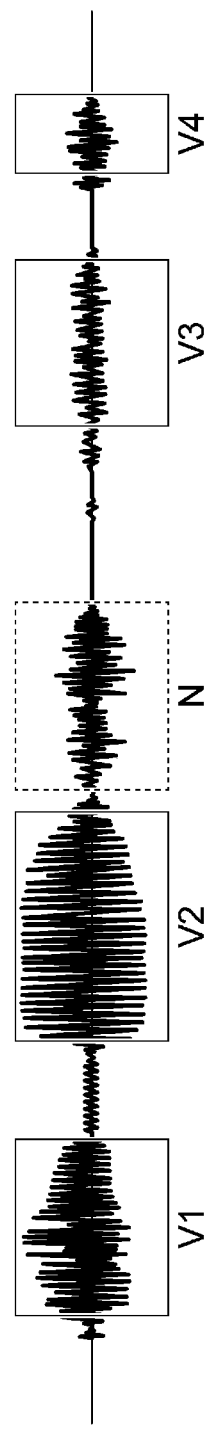
FIG. 3B is a diagram illustrating specific processing for a vowel section, especially illustrating how a vowel section is specified and an ID is provided to the vowel section.

FIGS. 3A and 3B are diagrams illustrating processing for specifying a vowel section. FIG. 3A is a diagram illustrating how a start point and an end point of a vowel section are specified. FIG. 3B is a diagram illustrating how a vowel section is specified and an ID is added to the vowel section. The vowel section specification unit 30 specifies a vowel section in a speech signal, based on a feature amount extracted by the feature amount extraction unit 20. As described above, a first formant and a second formant of a feature amount are important to identify a vowel. Therefore, for example, such a feature amount is used to specify a vowel section by the vowel section specification unit 30.

Figure 4:
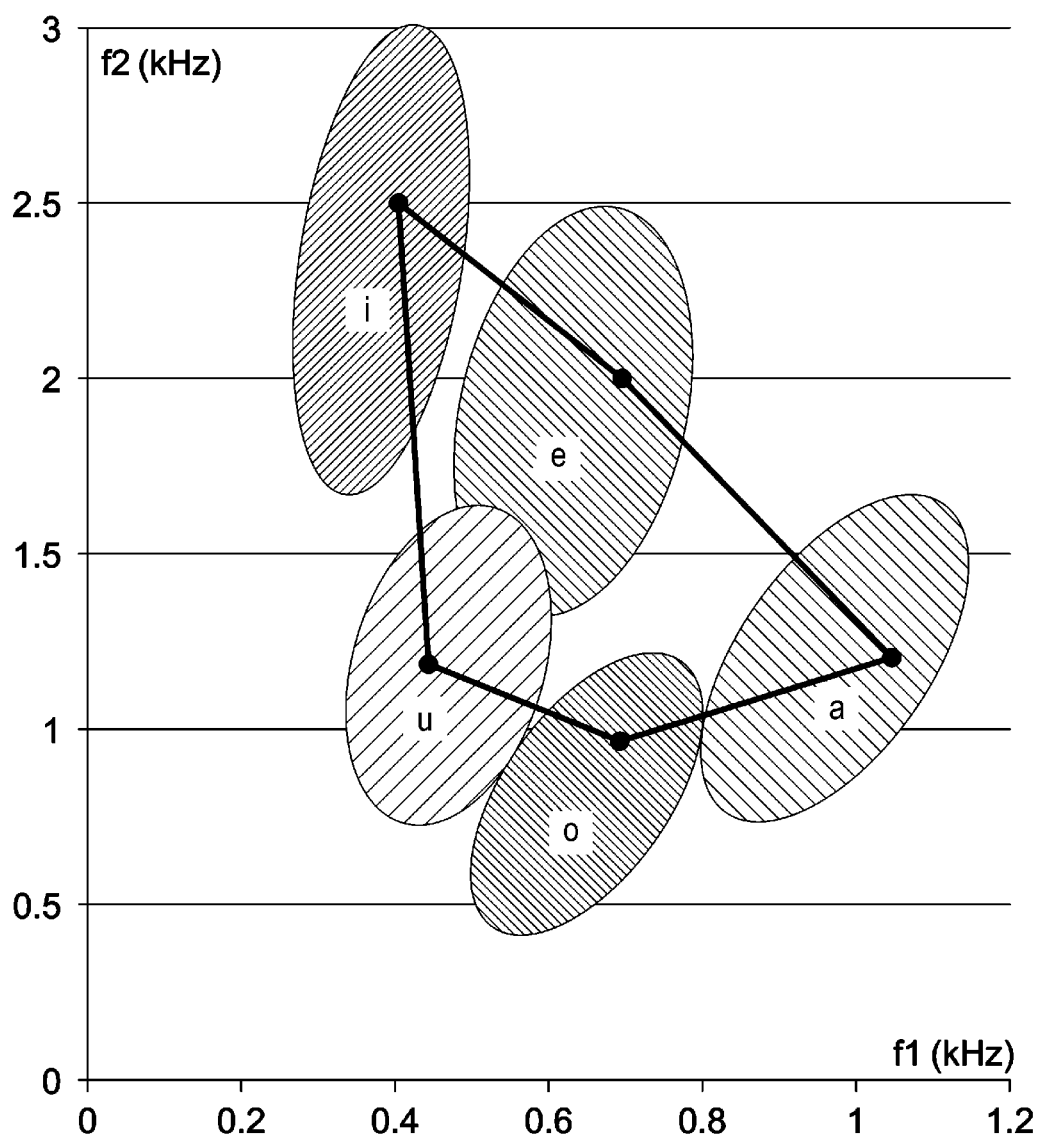
FIG. 4 is a diagram illustrating the relationship of first and second formant frequencies and Japanese vowels.

FIG. 4 is a diagram illustrating the relationship of the frequencies of the first and second formants and Japanese vowels, "a", "i", "u", "e", and "o". In FIG. 4, the horizontal axis represents the frequency (kHz) of the first formant, and the vertical axis represents the frequency (kHz) of the second formant (f2). As illustrated in FIG. 4, the first formant and the second formant have a characteristic relationship according to the type of vowel. Therefore, in the case where the values of the first formant and the second formant correspond to these values in a specific section in a speech signal as a processing target, that is, in the case where the values of the first formant and the second formant are equal to values characteristic to a vowel, the vowel section specification unit 30 specifies the section as a vowel section.

More specifically, a feature amount is acquired for each speech frame, and therefore, the vowel section specification unit 30 determines, by examining the feature amount of each speech frame, whether or not the speech frame is a vowel frame. A vowel frame represents a speech frame in which the value of a feature amount is equal to a value characteristic to a vowel. For example, the vowel section specification unit 30 defines a section in which the value of the frequency of appearance of a vowel frame is equal to or more than a specific value as a vowel section.

Furthermore, the vowel section specification unit 30 defines a point at which the first vowel frame appears in a vowel section as a start point of the vowel section, and defines a point at which the last vowel frame appears in the vowel section as an end point of the vowel section. Specific contents of conditions for specifying a vowel section (the frequency of appearance of a vowel frame, the positions of the start point and the end point described above, and the like) are not particularly limited and may be set separately for individual systems.

In the example illustrated in FIG. 3A, four pairs of start point and end point of a section in which a vowel frame appears in a speech signal as a processing target (a pair of a start point V1S and an end point V1E, a pair of a start point V2S and an end point V2E, a pair of a start point V3S and an end point V3E, and a pair of a start point V4S and an end point V4E) are detected. As a result, as illustrated in FIG. 3B, sections sandwiched between the corresponding start points and the end points are specified as vowel sections V1, V2, V3, and V4. Furthermore, in FIGS. 3A and 3B, a point at which certain speech is recorded (point at which the amplitude of a speech signal is large) is present immediately after the end point V2E of the vowel section V2. However, no vowel frame is present in the vowel frame at this point. Therefore, this section N is defined as noise not a vowel section.

<Processing for Estimating Emotion for Each Vowel Section>

Next, processing for estimating an emotion for each vowel section by the vowel emotion estimation part 41 will be explained. The vowel emotion estimation part 41 refers to a distribution of probabilities of feature amount patterns for each of set emotions stored in the vowel probability DB 50, for each vowel section specified by the vowel section specification unit 30, obtains a probability that each vowel section corresponds to each of the set emotions, and estimates an emotion of a speaker in the vowel section in accordance with the obtained probability.

Figure 5:
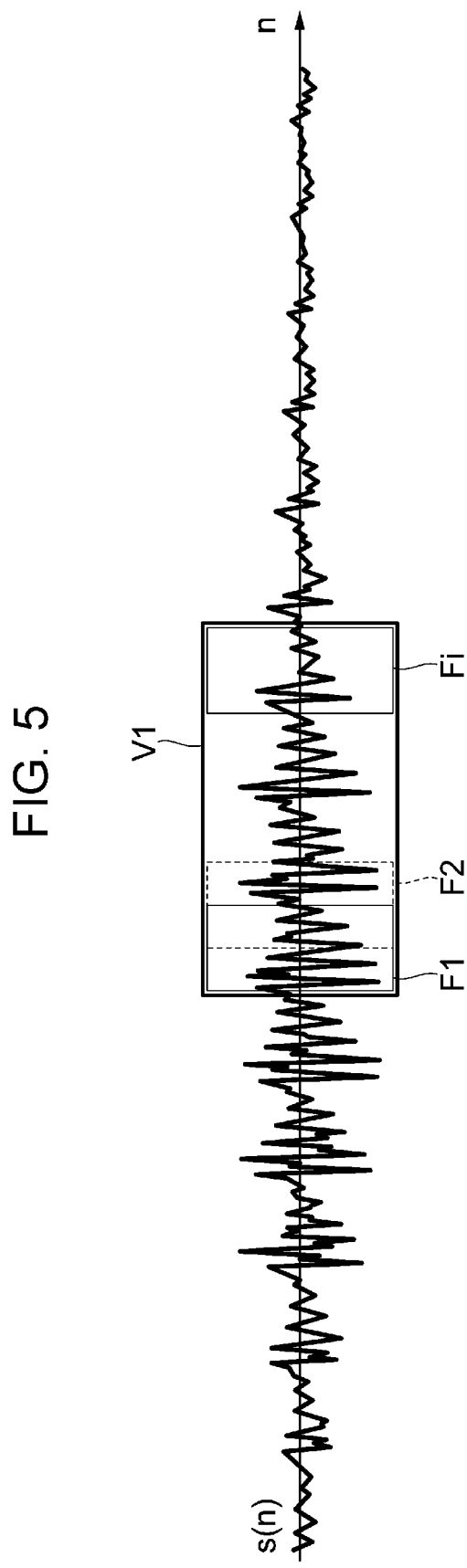
FIG. 5 is a diagram illustrating emotion estimation processing for a vowel section.

FIG. 5 is a diagram illustrating processing for estimating an emotion of a vowel section. First, the vowel emotion estimation part 41 pays attention to a vowel section specified by the vowel section specification unit 30, and defines the vowel section as a processing target. In the example illustrated in FIG. 5, the vowel section V1 is paid attention to as a processing target. Next, the vowel emotion estimation part 41 extracts, for each of the speech frames F1 to Fi included in the vowel section V1, a feature amount pattern. Then, the vowel emotion estimation part 41 refers to the vowel probability DB 50 to obtain a probability that the feature amount pattern of each of the speech frames F1 to Fi corresponds to each of set emotions. Next, the vowel emotion estimation part 41 obtains, based on the relationship of the feature amount pattern of each of the speech frames F1 to Fi and each of the set emotions, a probability that the vowel section V1 corresponds to each of the set emotions. For example, E types of emotion are set, and a probability $P(V_k|e_j)$ that speech produced at the time when a speaker has an emotion $e_j$ (j=1 to E) represents a specific vowel Vk is expressed by an equation (Math. 1). In the equation, $b(V_{kh}|e_j)$ represents a probability that a speech frame of a specific feature amount pattern $V_{kh}$ (h=1 to m) appears in speech produced at the time when a speaker has an emotion $e_j$.

$$P(V_k | e_j) = \prod_{h=1}^{m} b(V_{kh} | e_j)$$

The vowel emotion estimation part 41 performs the processing described above for each vowel section specified by the vowel section specification unit 30. Accordingly, an emotion of a speaker in each vowel section of a speech signal is estimated.

<Processing for Analyzing Transition of State Between Vowel Sections>

Next, processing for analyzing transition of state between vowels by the state transition analysis part 42 will be explained. The state transition analysis part 42 refers to a probability of transition of state between vowels stored in the transition probability DB 60 to obtain a probability of transition of emotion between vowel sections for each combination of vowel sections, based on a result of estimation of an emotion for each vowel section by the vowel emotion estimation part 41.

Figure 6:
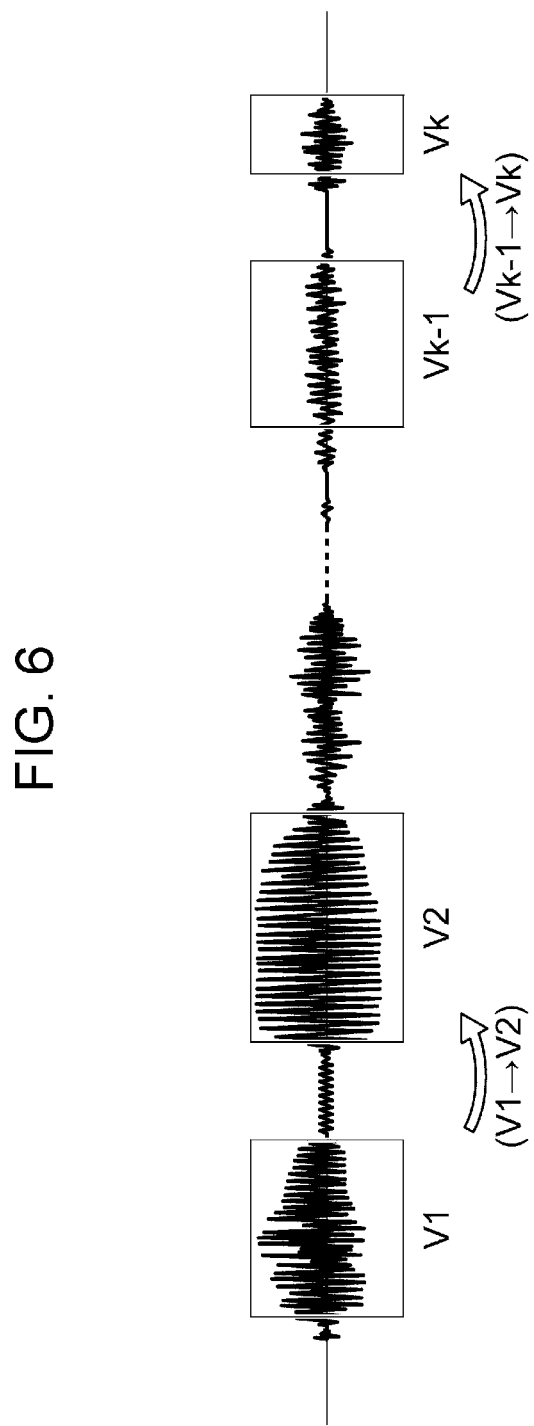
FIG. 6 is a diagram illustrating processing for analyzing transition of state between vowel sections.

FIG. 6 is a diagram illustrating processing for analyzing transition of state between vowel sections. First, the state transition analysis part 42 pays attention to two adjacent vowel sections in a speech signal. Then, the state transition analysis part 42 acquires a state transition probability corresponding to the combination of vowel sections from the transition probability DB 60. In the example illustrated in FIG. 6, state transition probabilities are acquired for k−1 pairs of vowel sections: V1 and V2; . . . ; and Vk−1 and Vk.

<Processing for Estimating Emotion in Speech as Processing Target>

Next, processing for estimating an emotion for the entire speech as a processing target by the emotion estimation unit 40 will be explained. The emotion estimation unit 40 estimates, based on results of estimation of emotions for individual vowel sections by the vowel emotion estimation part 41 and state transition probabilities acquired by the state transition analysis part 42, an emotion of a speaker in speech including the vowel sections. Specifically, the emotion estimation unit 40 obtains a probability that each of the types of emotion set in the emotion estimation system 100 corresponds to an emotion of a speaker in speech as a processing target, and defines the emotion with the highest probability as the emotion of the speaker. For example, a probability $P(e_j|X)$ that an emotion of a speaker in speech X as a processing target corresponds to an emotion $e_j$ (j=1 to E) of the types of emotion set in the emotion estimation system 100 is expressed by, for example, the following equation.

$$P(e_j | X) = P(V_1 | e_j) * A(V_1 V_2 | e_j) * P(V_1 | e_j) * \ldots * P(V_{k-1} | e_j) *$$

$$A(V_{k-1} V_k | e_j) * P(V_k | e_j) = \prod_{K=1}^{k} P(V_K | e_j) \prod_{K=1}^{k-1} A(V_K V_{K+1} | e_j)$$

In the above equation, $P(V_k|e_j)$ represents a probability that speech produced at the time when a speaker has an emotion $e_j$ is a vowel VK (K=1 to k), and $A(V_K V_{K+1}|e_j)$ represents a probability that a transition of state VK→VK+1 (K=1 to k−1) between vowels occurs at the time when the speaker has the emotion $e_j$. Then, the emotion E(X) of the speaker in the speech X is expressed by the following equation.

$$E(X) = \arg\max[P(e_j | X)]$$

<Operation of Emotion Estimation System>

Figure 7:
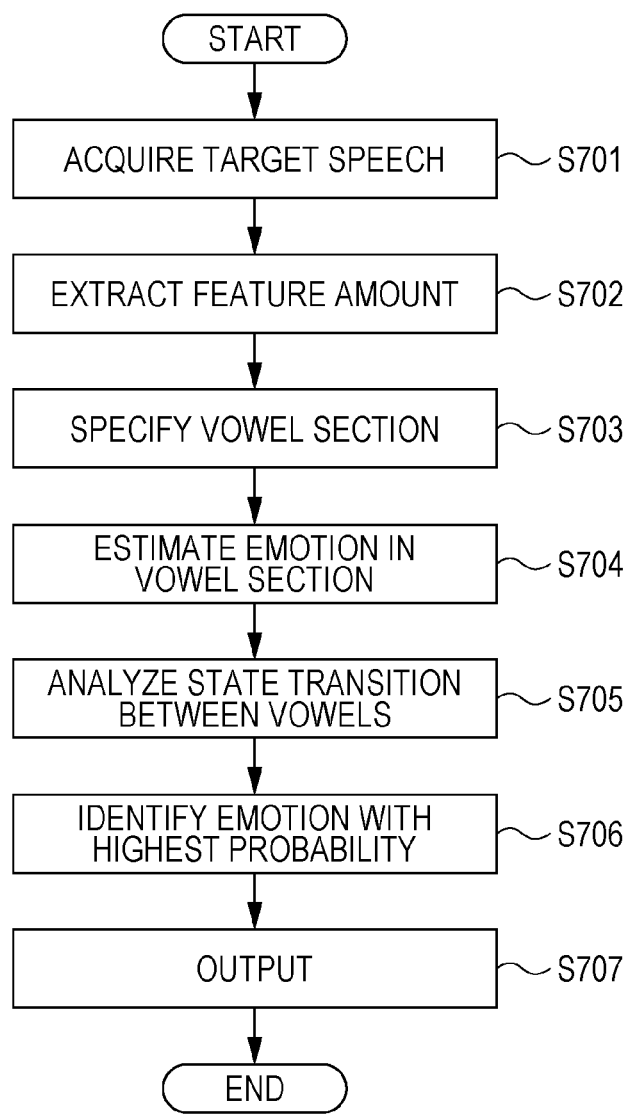
FIG. 7 is a flowchart illustrating an operation of an emotion estimation system.

FIG. 7 is a flowchart illustrating an operation of the emotion estimation system 100. In a process by the emotion estimation system 100, the speech acquisition unit 10 first acquires speech as a processing target (target speech) (S701). The target speech is speech produced by a single speaker. In the case where recorded speech includes speech produced by a plurality of speakers, speech produced by a single speaker is cut out from the recorded speech and defined as target speech. Cutting out of speech produced by a single speaker may be performed by a person who listens to the speech or may be performed using a known method such as dividing the recorded speech by a blank part of a certain period of time.

Next, the feature amount extraction unit 20 divides the target speech into speech frames and extracts a feature amount for each speech frame (S702). Then, the vowel section specification unit 30 specifies a vowel section based on the feature amount for each speech frame extracted by the feature amount extraction unit 20 (S703). As described above, at this time, a vowel section in target speech is specified based on a feature amount of a speech signal, and speech recognition processing is not performed. However, the type of vowel in a vowel section may be identified based on a formant or the like as a feature amount.

Next, the vowel emotion estimation part 41 of the emotion estimation unit 40 estimates, for each vowel section, an emotion of the speech who produces the speech in the vowel section, based on a feature amount of a speech signal in the vowel section (S704). As described above, at this time, the vowel emotion estimation part 41 obtains a probability that, for each emotion set by the emotion estimation system 100, a feature amount pattern of a speech frame included in the vowel section that attention is paid to appears, and defines the emotion with the highest probability as a result of estimation of the emotion in the vowel section.

Next, the state transition analysis part 42 of the emotion estimation unit 40 analyzes, for each combination of vowel sections included in the target speech, transition of state between vowel sections (S705). Then, the emotion estimation unit 40 estimates an emotion of the speaker in the target speech, based on the result of estimation of an emotion for each vowel section by the vowel emotion estimation part 41 and the probability of transition of state between vowels obtained by the state transition analysis part 42. As described above, at this time, the emotion estimation unit 40 obtains, for each emotion of the speaker set by the emotion estimation system 100, a probability that the result of estimation of the emotion for each vowel section in the target speech and the probability of transition of state between vowels appear. Then, the emotion estimation unit 40 identifies the emotion with the highest probability, as the result of estimation of the emotion in the target speech (S706). After that, the output unit 70 outputs, as the result of estimation of the emotion in the target speech, the emotion identified by the emotion estimation unit 40 (S707).

<Hardware Configuration Example>

Figure 8:
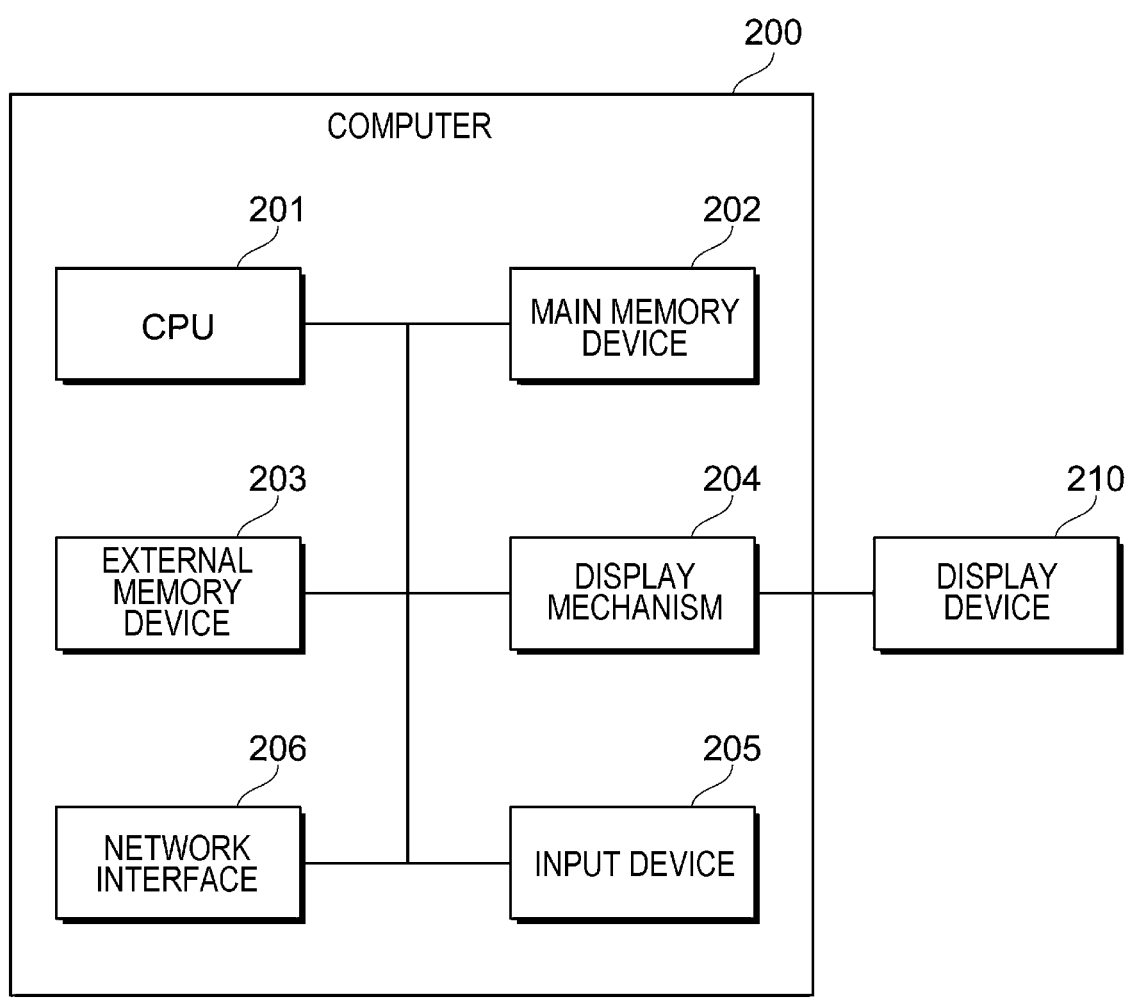
FIG. 8 is a diagram illustrating an example of the hardware configuration of a computer used as an emotion estimation system.

FIG. 8 is a diagram illustrating an example of the hardware configuration of a computer used as the emotion estimation system 100. A computer 200 illustrated in FIG. 8 includes a central processing unit (CPU) 201 as computing means and a main memory device (main memory) 202 and an external memory device 203 as memory means. The CPU 201 reads a program stored in the external memory device 203 into the main memory device 202 and executes the program. For example, a random access memory (RAM) is used as the main memory device 202. For example, a magnetic disk device, a solid state drive (SSD), or the like is used as the external memory device 203. Furthermore, the computer 200 also includes a display mechanism 204 for performing display and output on a display device 210 and an input device 205 on which a user of the computer 200 performs an input operation. For example, a keyboard, a mouse, and the like are used as the input device 205. Furthermore, the computer 200 also includes a network interface 206 that allows connection with a network. The configuration of the computer 200 illustrated in FIG. 8 is merely an example, and a computer used in an exemplary embodiment is not intended to be limited to the configuration example illustrated in FIG. 8. For example, the computer may be configured to include, as the memory device, a nonvolatile memory such as a flash memory and a read only memory (ROM).

In the case where the emotion estimation system 100 illustrated in FIG. 1 is implemented by the computer 200 illustrated in FIG. 8, the feature amount extraction unit 20, the vowel section specification unit 30, and the emotion estimation unit 40, which includes the vowel emotion estimation part 41 and the state transition analysis part 42, are implemented when, for example, the CPU 201 executes a program. The vowel probability DB 50 and the transition probability DB 60 are implemented, for example, by the external memory device 203. The output unit 70 is implemented by, for example, the display mechanism 204 and the display device 210.

<Modifications>

In the emotion estimation system 100 according to this exemplary embodiment, a distribution of probabilities of feature amount patterns stored in the vowel probability DB 50 and probabilities of transition of state between vowels stored in the transition probability DB 60 are prepared in advance by performing statistical processing for speech collected as samples (sample speech). As a modification of an exemplary embodiment, a result obtained by performing processing for estimating an emotion in specific speech may be fed back to the emotion estimation system 100.

Specifically, a feature amount pattern in a speech frame and a pattern of transition of state between vowels extracted in the process of estimating an emotion of a speaker by the emotion estimation system 100 are stored in the vowel probability DB 50 and the transition probability DB 60 and are reflected. It is assumed that a feature amount pattern in produced speech and a pattern of transition of state between vowels are each different according to the speaker. Thus, by causing actual processing results for specific speech by a speaker to be fed back to the emotion estimation system 100 and causing the processing results to be reflected in each database, the emotion estimation system 100 is optimized for speech produced by the speaker, and the accuracy in estimation is thus improved. In the case where there are a plurality of speakers whose emotions are to be estimated by the emotion estimation system 100, identification information of a speaker may be added to information of processing results and fed back, and an optimized database may be established for each speaker.

Formants as a feature amount have been explained above with reference to the relationship of Japanese vowels and formants (see FIG. 4). However, a large impact of vowels on expression of emotions in produced speech is not a feature limited to Japanese but may be applied to various languages. However, it is assumed that a specific relationship of a feature amount in a speech signal of a vowel and an emotion is different depending on the language. The emotion estimation system 100 according to an exemplary embodiment uses a distribution of probabilities of feature amount patterns and a probability of transition of state between vowels in a speech signal in a vowel section obtained by performing statistical processing for sample speech. Therefore, by selecting a language of sample speech, the emotion estimation system 100 may be applied to speech in various languages.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An emotion estimation system comprising:
   a characteristic value extraction unit that analyzes recorded produced speech to extract a predetermined characteristic value;

a vowel section specification unit that specifies, based on the characteristic value extracted by the characteristic value extraction unit, a vowel section in the recorded produced speech, wherein a vowel is produced in the vowel section; and an estimation unit that estimates, based on whether a characteristic value pattern in the vowel section specified by the vowel section specification unit corresponds to one of types of emotion, an emotion of a speaker, wherein the characteristic value pattern comprises the characteristic value extracted by the characteristic value extraction unit.

2. The emotion estimation system according to claim 1, wherein the estimation unit refers to a vowel probability database in which a characteristic value pattern is recorded for each type of emotion set in advance for each vowel, to obtain a probability that the characteristic value pattern in the vowel section specified by the vowel section specification unit corresponds to each of the types of emotion.

3. The emotion estimation system according to claim 2, wherein the estimation unit divides the vowel section specified by the vowel section specification unit into a plurality of frames, refers to the vowel probability database to obtain a probability that a characteristic value pattern in each of the plurality of frames corresponds to each of the types of emotion, and identifies a type of emotion corresponding to the vowel section, based on the obtained probability for the frame.

4. The emotion estimation system according to claim 3, further comprising:
a vowel probability database update unit that records characteristic value pattern for each frame in the vowel section as a characteristic value pattern of a vowel corresponding to the vowel section into the vowel probability database.

5. The emotion estimation system according to claim 1, wherein the estimation unit
estimates, for each vowel section specified by the vowel section specification unit, an emotion of a speaker in the vowel section, based on a characteristic value of the vowel section,
refers to a transition probability database in which a probability that transition from an emotion in a vowel section to an emotion in another vowel section occurs is recorded for each combination of vowels, to obtain a probability of transition of emotion between vowels estimated for each of a plurality of vowel sections included in the produced speech, and
identifies an emotion of the speaker in the entire produced speech, based on a result of estimation of an emotion for each of the vowel sections and the probability of transition of emotion between vowel sections for each combination of vowel sections.

6. The emotion estimation system according to claim 5, further comprising:
a transition probability database update unit that updates, based on a probability of transition of emotion between vowels for each combination of vowels included in the produced speech obtained by the estimation unit, the probability of transition of emotion between corresponding vowels.

7. A non-transitory computer readable medium storing a program causing a computer to execute a process for emotion estimation, the process comprising:
analyzing recorded produced speech to extract a predetermined characteristic value;
specifying, based on the extracted characteristic value, a vowel section in the recorded produced speech, wherein a vowel is produced in the vowel section; and
estimating, based on whether characteristic value pattern in the vowel section corresponds to one of types of emotion, an emotion of a speaker, wherein the characteristic value pattern comprises the extracted characteristic value.

8. An emotion estimation system comprising:
characteristic value extraction means for analyzing recorded produced speech to extract a predetermined characteristic value;
vowel section specification means for specifying, based on the characteristic value extracted by the characteristic value extraction means, a vowel section in the recorded produced speech, wherein a vowel is produced in the vowel section; and
estimation means for estimating, based on whether a characteristic value pattern in the vowel section specified by the vowel section specification means corresponds to one of types of emotion, an emotion of a speaker, wherein the characteristic value pattern comprises the characteristic value extracted by the characteristic value extraction means.

* * * * *